United States Patent
Koban et al.

(10) Patent No.: US 11,802,253 B2
(45) Date of Patent: *Oct. 31, 2023

(54) COMPOSITIONS, SYSTEM AND METHODS FOR INTRODUCING PAG LUBRICANT OR REFRIGERANT INTO AN AIR-CONDITIONING OR SYSTEM USING LOWER OR LOW GWP REFRIGERANT OR REFRIGERANT BLENDS

(71) Applicant: THE CHEMOURS COMPANY FC, LLC, Wilmington, DE (US)

(72) Inventors: Mary E. Koban, Chadds Ford, PA (US); Nina E. Gray, Philadelphia, PA (US); Hubert Mentz, Jr., Perryville, MD (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/869,470

(22) Filed: Jul. 20, 2022

(65) Prior Publication Data
US 2022/0372389 A1    Nov. 24, 2022

Related U.S. Application Data

(63) Continuation of application No. 17/141,355, filed on Jan. 5, 2021, now Pat. No. 11,427,777, which is a (Continued)

(51) Int. Cl.
*C10M 107/34* (2006.01)
*B60H 1/00* (2006.01)
(Continued)

(52) U.S. Cl.
CPC ....... *C10M 107/34* (2013.01); *B60H 1/00585* (2013.01); *C09K 5/041* (2013.01);
(Continued)

(58) Field of Classification Search
CPC .......... B60H 1/00585; C09K 2205/126; C09K 5/041; C09K 5/045; C10N 2030/08; C10N 2040/30; F25B 2345/001; F25B 45/00
See application file for complete search history.

(56) References Cited

U.S. PATENT DOCUMENTS

| 4,755,316 A | 7/1988 | Magid et al. |
| 5,152,926 A | 10/1992 | Brown |

(Continued)

FOREIGN PATENT DOCUMENTS

| CA | 2557873 A1 | 11/2014 |
| EP | 2727980 B1 | 1/2020 |

(Continued)

OTHER PUBLICATIONS

4seasons: "Guia Ilustrada De Partes Para El Mercado Mexano AC-78", Apr. 1, 2015, p. 939, URL: http://pageturnpro2.com.s3-website-us-east-1.amazonaws.com/Publications/201604/283/71881/PDF/131057967243720000_MexicoIllustrationGuide_Opt.pd.

(Continued)

*Primary Examiner* — Mark Kopec
*Assistant Examiner* — Jaison P Thomas

(57) ABSTRACT

Compositions, systems and methods for introducing lubricants, and additives, that are designed to work with environmentally friendly refrigerants into vehicle heat management systems including passenger compartment air conditioning (A/C) systems are disclosed. Methods for charging lubricants and specific additives using environmentally desirable (low GWP) refrigerant or refrigerant blend compositions into an environmentally friendly system, such as a system that uses HFO-1234yf, are also disclosed.

19 Claims, 2 Drawing Sheets

Diagram of Vehicle A/C system with Container attached to low side service port

Related U.S. Application Data continuation of application No. 16/252,756, filed on Jan. 21, 2019, now Pat. No. 10,883,063.

(60) Provisional application No. 62/745,447, filed on Oct. 14, 2018, provisional application No. 62/620,568, filed on Jan. 23, 2018.

(51) Int. Cl.
    *C09K 5/04*     (2006.01)
    *C10M 169/04*     (2006.01)
    *C10N 30/08*     (2006.01)
    *C10N 40/30*     (2006.01)

(52) U.S. Cl.
    CPC .. *C10M 169/04* (2013.01); *C10M 2209/1033* (2013.01); *C10M 2227/04* (2013.01); *C10M 2229/02* (2013.01); *C10N 2030/08* (2013.01); *C10N 2040/30* (2013.01)

(56) References Cited

U.S. PATENT DOCUMENTS

| | | | |
|---|---|---|---|
| 5,976,399 A | 11/1999 | Schnur | |
| 8,033,120 B2 * | 10/2011 | Singh | C10M 171/008 252/75 |
| 10,450,488 B2 | 10/2019 | Boussand | |
| 10,883,063 B2 | 1/2021 | Koban et al. | |
| 2006/0116310 A1 | 6/2006 | Singh et al. | |
| 2007/0187639 A1 | 8/2007 | Leck et al. | |
| 2007/0289317 A1 | 12/2007 | Minor et al. | |
| 2007/0290164 A1 | 12/2007 | Kaneko | |
| 2009/0241562 A1 | 10/2009 | Thomas et al. | |
| 2011/0272624 A1 | 11/2011 | Serrano et al. | |
| 2014/0331697 A1 | 11/2014 | Minor et al. | |
| 2016/0068731 A1 | 3/2016 | Minor et al. | |
| 2017/0131009 A1 | 5/2017 | Harkins | |
| 2019/0062665 A1 | 2/2019 | Matsumoto | |
| 2021/0122990 A1 | 4/2021 | Koban et al. | |

FOREIGN PATENT DOCUMENTS

| | | |
|---|---|---|
| KR | 20070090939 A | 9/2007 |
| WO | 2006069362 A2 | 6/2006 |
| WO | 2008027595 A1 | 3/2008 |
| WO | 2009018117 A1 | 2/2009 |
| WO | 2014172272 A1 | 10/2014 |
| WO | 2017150273 A1 | 9/2017 |

OTHER PUBLICATIONS

Anonymous: "PC-2 | R-134a PAG 100 Lubricant charge with ICE 32", Feb. 24, 2017, URL: https://web.archive.org/web/20170224040427/http://rechargeac.com/products/ac-lubricants/PC-2?lid=478.
Anonymous: "Four Seasons Future is Now Promotion", May 18, 2017, URL: https://www.macsw.org/web/macs/News/MACS_Member_News/Four_Seasons_Future_is_now_Promotion.aspx.
ASHRAE Standard 34-2016, Designation and Safety Classification of Refrigerants, 2016.
ASHRAE Standard 97-2007, Sealed Glass Tube Method to Test the Chemical Stability of Materials for Use within Refrigerant System, Jun. 23, 2007.
ASTM D445-18, Designation: 71 Section 1/97, Standard Test Method for Kinematic Viscosity of Transparent and Opaque Liquids (and Calculation of Dynamic Viscosity), 2018.
ASTM D664-07, Standard Test Method for Acid Number of Petroleum Products by Potentiometric Titration, 2007.
ASTM D-7042-16, Standard Test Method for Dynamic Viscosity and Density of Liquids by Stabinger Viscometer (and the Calculation of Kinematic Viscosity), Jun. 2016.
ASTM E582-07, Standard Test Method for Minimum Ignition Energy and Quenching Distance in Gaseous Mixtures, 2013.
ASTM E681-09, Standard Test Method for Concentration Limits of Flammability of Chemicals (Vapors and Gases), 2015.
PCT International Search Report and Written Opinion for PCT/US2018/066601 dated Mar. 28, 2019.
SAE International J2843, R-1234yf [HFO-1234yf] Recovery/Recycling/Recharging Equipment for Flammable Refrigerants for Mobile Air-Conditioning Systems, Jan. 2013.

* cited by examiner

COMPOSITIONS, SYSTEM AND METHODS FOR INTRODUCING PAG LUBRICANT OR REFRIGERANT INTO AN AIR-CONDITIONING OR SYSTEM USING LOWER OR LOW GWP REFRIGERANT OR REFRIGERANT BLENDS

FIELD OF INVENTION

The present invention relates generally to compositions, systems and methods of introducing lubricants, and additives, that are designed to work with environmentally friendly refrigerants in vehicle heat management systems including passenger compartment air conditioning (A/C) systems. More specifically, this invention relates to methods for charging lubricants and specific additives using environmentally desirable (low GWP) refrigerant or refrigerant blend compositions into an environmentally friendly system, such as a system that uses HFO-1234yf. This invention also relates to methods for charging refrigerants which contain lubricants and specific additives into an environmentally friendly system, such as a system that uses HFO-1234yf

BACKGROUND OF THE INVENTION

Since the mid-1990's, automotive air-conditioning (A/C) systems have used refrigerant R-134a for vapor compression cycle. Now, due to environmental and societal pressures, global automotive manufacturers are transitioning to the low global warming potential (GWP) refrigerant, HFO-1234yf (2,3,3,3-tetrafluoropropene), as the vehicle A/C refrigerant. In the traditional vapor compression A/C system, the A/C compressor circulates refrigerant through the A/C system to achieve cooling. Therefore, the A/C compressor is critical to A/C system operation. A/C compressors function as the heart of the A/C system pumping the operating fluid through the system. Without correct operation of the A/C compressor, the A/C system would fail.

To operate accordingly, A/C compressors require lubricants with the correct physical parameters (viscosity, moisture, TAN, etc.). The lubricant must completely circulate through the A/C system. The lubricant must be carried by the refrigerant from one part of the system to the next and the lubricant must also be able to carry the refrigerant from one part of the system to a different part of the system while providing lubrication when internal to the compressor. Therefore, mutual refrigerant/oil compatibility over the A/C system operating range of 0° C. to 40° C. is essential to effective operation of the system.

Automotive original equipment manufacturers (OEMs) typically add A/C lubricants during the initial vehicle A/C filling process. A/C systems may require repair due to a component failure (hose or line break) or vehicle accident which compromises the A/C system. Typically, the automotive aftermarket or service industry employs a recovery, recycle, recharge or "R/R/R" machine to re-inject/re-fill refrigerant and lubricant into A/C systems after repair. However, the current R/R/R machine designed for use with HFO-1234yf, which is based on SAE J2843, particularly section 8.9.5.1 of said SAE standard (hereby incorporated by reference), does not allow automatic injection of lubricant into the system after repair by the R/R/R machine. The lubricant must be "hand injected" or "mechanically injected." For each of these options, the lubricant is filled into an injector and then a hose is attached to the low side of the A/C system. The vehicle is turned on, and the NC system set to maximum cooling, which also starts the A/C compressor. When the A/C compressor starts to cycle, the attached injector is turned to the open position and lubricant is conveyed along the hose to the A/C system.

While this method can be used, it is a tedious process and requires use of a hand-pump type mechanism that pushes the lubricant down the connected hose to an A/C service port. Lubricant is pulled into the system by the A/C compressor. Lubricant can adhere to the walls of the hose during the delivery process thereby making it difficult to deliver an appropriate amount of lubricant into the system. Therefore, there is a need in this art for a quick and convenient way to convey lubricant into the A/C system without the use of a hand injector.

It should also be noted that sometimes it may be advantageous to use a similar delivery process to deliver refrigerant, refrigerant containing lubricant or refrigerant containing other performance enhancing additives into the A/C system using this same method of conveyance.

SUMMARY OF THE INVENTION

The instant invention solves problems associated with conventional compositions, systems and methods by providing a low GWP refrigerant that can be used to inject lubricant into the low GWP HFO-1234yf automotive A/C system through use of a typical A/C aftermarket recharging hose. In the hand injector or hand pump lubricant flow is controlled by the lubricant viscosity and suction of the A/C compressor. In the inventive method, refrigerant is used to convey the lubricant and/or lubricant additive package down the A/C hose without sticking on the hose thereby ensuring more lubricant or lubricant/additive package is introduced into the A/C system, so material flow is improved.

Using the hand injector or hand pump can lead to lubricant adhering to the hose lines connecting to the A/C system. Use of the refrigerant to transfer the lubricant to the system ensures that more lubricant is introduced into the A/C system versus the hand or pump injectors as the refrigerant carries the lubricant and conveys the lubricant into the A/C system. The lubricant or lubricant/additive and refrigerant are co-packaged into a conventional container or can under conditions in which the lubricant and refrigerant are miscible. Upon being discharged from the small container, the refrigerant component will change state from compressed liquefied gas to vapor, while the oil component is atomized. During this process, refrigerant, which is miscible with the lubricant, will atomize the lubricant or lubricant/additive mixture and will convey the lubricant or lubricant/additive mixture further along the hose and into the A/C system before the lubricant or lubricant/additive mixture can settle out on the A/C recharge hose walls.

One aspect of the invention relates to a composition comprising about 50 to about 80 wt % PAG lubricant and about 20 to about 50 wt % low GWP refrigerant.

Another aspect of the invention relates to a composition comprising about 60 to about 65 wt % PAG lubricant and about 35 to about 40 wt % low GWP refrigerant.

Another aspect of the invention relates to the foregoing composition further comprising about 1 to about 5 wt % acid scavengers.

Another aspect of the invention relates to any of the foregoing compositions further comprising about 1 to about 5 wt % performance enhancers.

A further aspect of the invention relates to any of the foregoing compositions further comprising about 1 to about 10 wt % of flame suppressants.

One aspect of the invention relates to a container comprising any of the foregoing compositions for use to directly deliver the composition into a vehicle A/C system.

One aspect of the invention relates to a method for delivering a PAG lubricant into the vehicle A/C system using any of the foregoing composition or containers.

Another aspect of the invention comprises the foregoing method and further comprising delivering acid scavengers into the vehicle A/C system.

Another aspect of the invention comprises the foregoing methods and further comprising delivering performance enhancers into the vehicle A/C system.

Another aspect of the invention comprises the foregoing methods and further comprising delivering flame suppressants into the vehicle A/C system.

A further aspect of the invention comprises the foregoing methods wherein the method is conducted under pressure and temperature conditions under which the lubricant is miscible with the refrigerant.

One aspect of the invention comprises a system for delivering any of the foregoing compositions, methods and container to an automotive A/C system comprising: a container comprising the composition, a compressor, condenser, dryer, expansion valve, and an evaporator.

A further aspect of the invention comprises using the kit shown in FIG. 2 for providing the composition that is used in any of the foregoing compositions and methods.

Another aspect of the invention relates to a composition comprising about 1 to about 15 wt % PAG lubricant and about 85 to about 99 wt % low GWP refrigerant.

Further aspect of the invention relates to a composition comprising about 1 to about 10 wt % PAG lubricant and about 90 to about 99 wt % low GWP refrigerant A further aspect of this invention relates to a composition comprising about 1 to about 5 wt % PAG lubricant and about 95 to about 99 wt % low GWP refrigerant The various aspects and embodiments disclosed herein can be used alone or in various combinations with each other.

DETAILED DESCRIPTION

Figure 1:
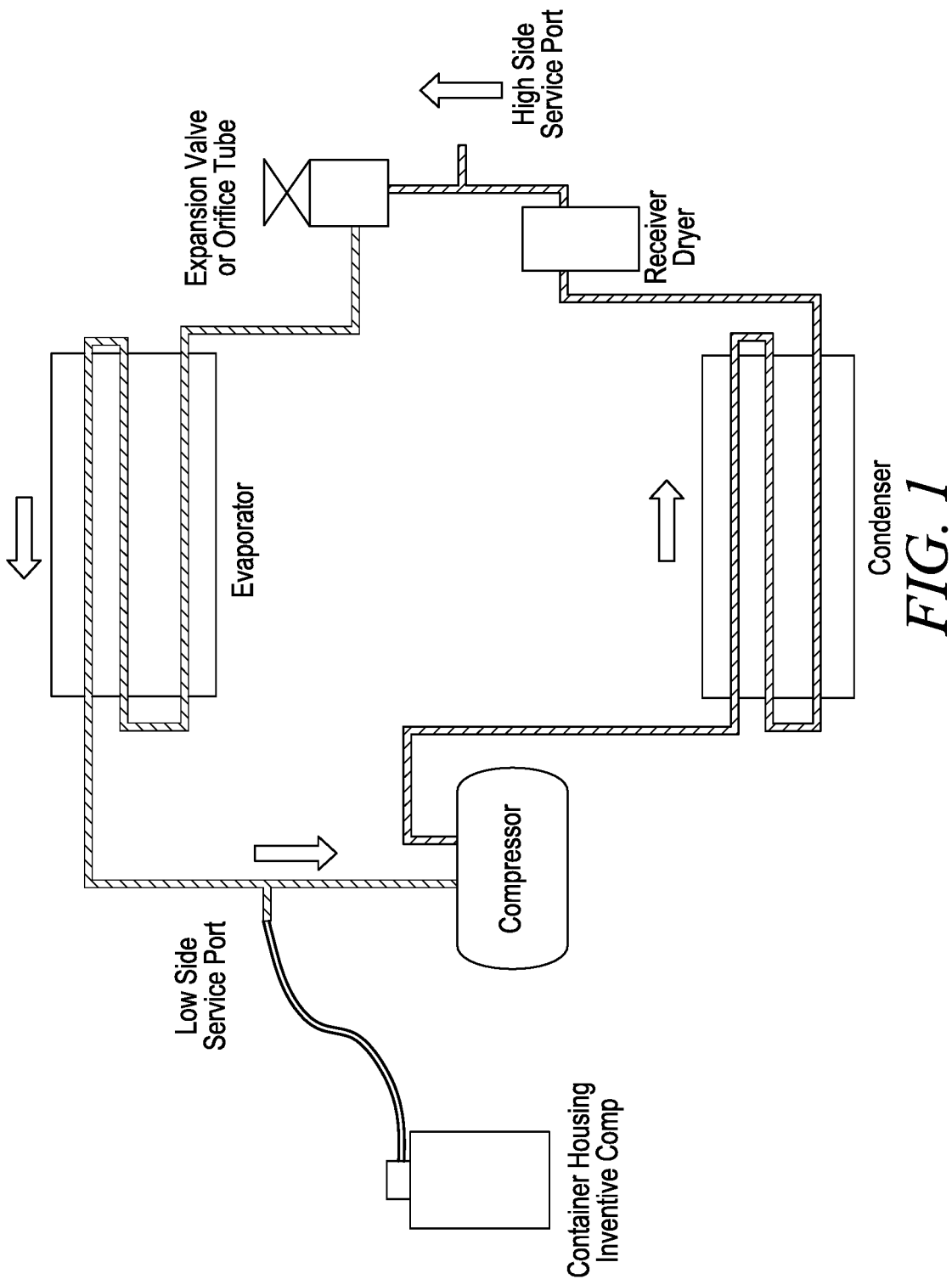
FIG. 1 is a schematic drawing of a system for introducing the inventive composition to an A/C system.

The present invention relates generally to compositions consisting of lubricants, and additives, that are designed to work with environmentally friendly refrigerants. More specifically, this invention relates to compositions comprising or consisting essentially of about 50 to about 80 wt %, about 55 to about 70 wt %, or about 60 to about 65 wt % PAG lubricants, about 0 to about 5 wt % additives and about 20 to about 50 wt %, about 30 wt % to about 45 wt %, or about 35 wt % to about 40 wt % low GWP refrigerants or refrigerant blends for use in A/C system.

This invention also relates to compositions comprising or consisting essentially of about 1 to about 15 wt %, about 1 to about 10 wt %, or about 1 to about 5 wt % PAG lubricants, about 0 to about 5 wt % additives and about 85 to about 99 wt %, about 90 wt % to about 99 wt %, or about 95 wt % to about 99 wt % low GWP refrigerants or refrigerant blends.

Lubricant

The lubricant chosen for this composition preferably has sufficient solubility in the vehicle's A/C refrigerant to ensure that the lubricant can return to the compressor from the evaporator. Furthermore, the lubricant preferably has a relatively low viscosity at low temperatures so that the lubricant is able to pass through the cold evaporator. In one preferred embodiment, the lubricant and A/C refrigerant are miscible over a broad range of temperatures. Preferred lubricants may be one or more polar, oxygenated compounds. Preferred polar, oxygenated compounds include polyalkylene oxides also known as polyalkylene glycols (PAGs).

Polyalkylene glycols as used herein include compounds containing more than one alkylene oxide wherein one or more of the ends are opened with a moiety (group) that does not contain an active hydrogen atom. Any alkylene oxide which facilitates lubrication can be used with ethylene oxide and propylene oxide being preferred and propylene oxide more preferred. End capping moieties include any moiety which does not interfere with lubrication or refrigeration. Preferred end capping moieties include lower alkyl groups; with C1 to 4 lower alkyl groups more preferred. Preferred PAG lubricants include one or any combination of alkyl ether capped compounds, ester capped compounds or monols that have at least a single hydroxyl group. Preferred alkylene glycols are single end capped or double end capped, with double capped being more preferred.

In a preferred embodiment, the lubricant is soluble in the vehicle A/C system refrigerant at temperatures between about 0° C. and about 100° C., and more preferably in the range of about 0° C. and about 40° C., and even more specifically between 5° C. and 40° C. In another embodiment, attempting to maintain the lubricant in the compressor is not a priority and thus high temperature solubility is not preferred. In this embodiment, the lubricant is soluble at temperatures above about 70° C., more preferably at temperatures above about 80° C., and most preferably at temperatures between 90-95° C.

The lubricant may have a kinematic viscosity (measured at 40° C., according to ASTM D445) greater than about 5 cSt, preferably greater than about 10 cSt, and most preferably greater than 20 cSt. The lubricant may have a kinematic viscosity (measured at 40° C., according to ASTM D445) of less than about 600 cSt, more preferably less than about 320 cSt, and most preferably, less than about 210 cSt. Ideally, the lubricant, when measured at 40° C., according to ASTM D445, will have kinematic viscosity between 40-50 cSt.

The lubricant preferably has a molecular weight (as measured by Gel Permeation Chromatography (GPC) or Time of Flight Mass Spectrometry (TOF-MS) between about 1000 and about 4000, more preferably between about 1500 and about 3500. Lubricants with molecular weights in these ranges provide Falex Wear testing results that are more favorable compared to lubricants with molecular weights outside of these ranges. Table 1 illustrates suitable characteristics of a lubricant for use with the inventive composition.

TABLE 1

| Specification Item | Units | Method | PAG Properties |
| --- | --- | --- | --- |
| Viscosity at 40° C. | cSt | ASTM D445 | 40-50 |
| Viscosity at 100° C. | CSt | ASTM D445 | 9.0-9.3 |
| Viscosity index | | ASTM D2270 | >190 |
| Colour | Gardner | ASTM D1500 | <1 |
| Flash point (COC) | ° C. | ASTM D92 | 160 min |

TABLE 1-continued

| Specification Item | Units | Method | PAG Properties |
|---|---|---|---|
| Pour point | °C. | ASTM D97 | −40 max |
| Specific Gravity (20° C.) | Kg/m3 | ASTM D1298 | 0.950-1.10 |
| Capping Efficiency | % | ASTM E326 | 80-90 |
| Total Acid Number | MgKOH/g | ASTM D974 | 0.1 max |
| Water content | ppm | ASTM E284 | 500 max |
| Critical Solution Temp. (3, 10 wt % lubricant) | °C. | ASHRAE 86 | 3 wt %: 30 min 10 wt %: 20 min |

Additionally, the PAG lubricant that are used in this composition should have material compatibility with the elastomers and plastics used in typical vehicle A/C systems. The PAG lubricant that is used should have good material compatibility with elastomers, such as, Neoprene WRT (polychloroprene/2,3-dichloro-1,3-butadiene copolymer), HNBR (hydrogenated nitrile butadiene rubber), NBR (nitrile butadiene rubber), EPDM (ethylene propylene diene monomer), silicone and butyl rubber as measured by ASHRAE 97: 2007 "Sealed Glass Tube Method to Test the Chemical Stability of Materials for Use within Refrigerant Systems" for two weeks at 100° C. Similarly, the PAG lubricants used should have good material compatibility with plastic materials namely polyester, nylon, epoxy, polyethylene, terephthalate and polyimide as measured by ASHRAE 97: 2007 "Sealed Glass Tube Method to Test the Chemical Stability of Materials for Use within Refrigerant Systems" for two weeks at 100° C. The plastics and elastomers in conjunction with the said PAG lubricants and HFO-1234yf should have a less than about 10%, less than about 8%, or less than about 7% wt gain or less than about 10%, less than about 8%, or less than about 7% linear swell or less than about 10, less than about 8, or less than about 7 hardness change as measured by a durometer. Ideally, the plastics and elastomers will have less than a 10% wt gain or less than 10% linear swell or less than a hardness change in at least two properties, as measured by a durometer, preferably, less than 10% for all three properties.

Several PAG lubricants were found that had the required miscibility with a particular low GWP refrigerant, namely HFO-1234yf (available from The Chemours Company as Opteon™ refrigerants), over the desired temperature range, had the desired lubricant viscosity and had the desired elastomer/plastics material compatibility. Specifically, the PAGs are noted as 46 cSt type PAG oils and known by the following tradenames "ND-12", "SP-A2", "PS-D1", and "FD46XG."

Refrigerant

The refrigerant portion of the mixture comprises at least one hydrofluoro-olefin or more commonly called an HFO type refrigerant, but it not limited to one particular HFO refrigerant. Hydrofluoro-olefins are low global warming potential (GWP) and zero ozone depletion potential (ODP). The Intergovernmental Panel on Climate Change (IPCC) periodically reviews and establishes the GWP for fluorocarbons. The hydrofluoro-olefin refrigerant embodied in this invention has a GWP less than about 100 GWP, but typically has GWP less than 10 and even as low as 1 GWP. A particularly, useful hydrofluoro-olefin comprises HFO-1234yf. HFO-1234yf exhibits a GWP of less than 1 according the UN's IPCC Fifth Assessment Report (AR5.)

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced. For mixtures, a weighted average can be calculated based on the individual GWPs for each component.

Leck et al. (US Patent Application Publication No. 2007/0187639, paragraph 10, hereby incorporated by reference) further lists examples of unsaturated fluorocarbon refrigerants which may be used as the fluoro-olefins in the present invention. As set forth in paragraph 10 of Leck et al., representative unsaturated fluorocarbon refrigerants or heat storage fluids include 1,2,3,3,3-pentafluoro-1-propene, 1,1,3,3,3 pentafluoro-1-propene, 1,1,2,3,3-pentafluoro-1-propene, 1,2,3,3-tetrafluoro-1-propene, 2,3,3,3-tetrafluoro-1-propene, 1,3,3,3-tetrafluoro-1-propene, 1,1,2,3-tetrafluoro-1-propene, 1,1,3,3-tetrafluoro-1-propene, 1,2,3,3-tetrafluoro-1-propene, 2,3,3-trifluoro-1-propene, 3,3,3-trifluoro-1-propene, 1,1,2-trifluoro-1-propene, 1,1,3-trifluoro-1-propene, 1,2,3-trifluoro-1-propene, 1,3,3-trifluoro-1propene, 1,1,1,2,3,4,4,4-octafluoro-2-butene, 1,1,2,3,3,4,4,4-octafluoro-1-butene, 1,1,1,2,4,4,4-heptafluoro-2-butene, 1,2,3,3,4,4,4-heptafluoro-1-butene, 1,1,1,2,3,4,4-heptafluoro-2-butene, 1,3,3,3-tetrafluoro-2-(trifluoromethyl)-2-propene, 1,1,3,3,4,4,4-heptafluoro-1-butene, 1,1,2,3,4,4,4-heptafluoro-1-butene, 1,1,2,3,3,4,4-heptafluoro-1-butene, 2,3,3,4,4,4-hexafluoro-1-butene, 1,1,1,4,4,4-hexafluoro-2-butene, 1,3,3,4,4,4 hexafluoro-1-butene, 1,2,3,4,4,4-hexafluoro-1-butene, 1,2,3,3,4,4-hexafluoro-1-butene 1,1,2,3,4,4-hexafluoro-2-butene, 1,1,1,2,3,4-hexafluoro-2-butene, 1,1,1,2,3,3-hexafluoro-2 butene, 1,1,1,3,4,4-hexafluoro-2-butene, 1,1,2,3,3,4 hexafluoro-1-butene, 1,1,2,3,4,4-hexafluoro-1-butene, 3,3,3-trifluoro-2-(trifluoromethyl)-1-propene, 1,1,1,2,4 pentafluoro-2-butene, 1,1,1,3,4-pentafluoro-2-butene, 3,3,4,4,4-pentafluoro-1-butene, 1,1,1,4,4-pentafluoro-2-butene, 1,1,1,2,3-pentafluoro-2-butene, 2,3,3,4,4-pentafluoro-1-butene, 1,1,2,4,4-pentafluoro-2-butene, 1,1,2,3,3-pentafluoro-1-butene, 1,1,2,3,4-pentafluoro-2-butene, 1,2,3,3,4 pentafluoro-1-butene, 1,1,3,3,3-pentafluoro-2-methyl-1-propene, 2-(difluoromethyl)-3,3,3-trifluoro-1-propene, 3,3,4,4-tetrafluoro-1-butene, 1,1,3,3-tetrafluoro-2-methyl-1-propene, 1,3,3,3-tetrafluoro-2-methyl-1-propene, 2-(difluoromethyl)-3,3-difluoro-1-propene, 1,1,1,2-tetrafluoro-2-butene, 1,1,1,3-tetrafluoro-2-butene, 1,1,1,2,3,4,4,5,5,5-decafluoro-2-pentene, 1,1,2,3,3,4,4,5,5,5-decafluoro-1-pentene, 1,1,1,4,4,5,5,5-decafluoro-2-pentene, 1,1,1,4,4,4-hexafluoro-2-(trifluoromethyl) 2-butene, 1,1,1,2,4,4,5,5,5-nonafluoro-2-pentene, 1,1,1,3,4,4,5,5,5-nonafluoro-2-pentene, 1,2,3,3,4,4,5,5,5-nonafluoro1-pentene, 1,1,3,3,4,4,5,5,5-nonafluoro-1-pentene, 1,1,2,3,3,4,4,5,5-nonafluoro-1-pentene, 1,1,2,3,4,4,5,5,5-nonafluoro 2-pentene, 1,1,1,12,3,4,4,5,5-nonafluoro-2-pentene, 1,1,1,2,3,4,5,5,5-nonafluoro-2-pentene, 1,2,3,4,4,4-hexafluoro-3-(trifluoromethyl)-1-butene, 1,1,2,4,4,4-hexafluoro-3-(trifluoromethyl)-1-butene, 1,1,1,4,4,4-hexafluoro-3-(trifluoromethyl)-2-butene, 1,1,3,4,4,4-hexafluoro-3-(trifluoromethyl)-1-butene, 2,3,3,4,4,5,5-octafluoro-1-pentene, 1,2,3,3,4,4,5,5-octafluoro-1-pentene, 3,3,4,4,4pentafluoro-2-(trifluoromethyl)-1-butene, 1,1,4,4,4 pentafluoro-3-(trifluoromethyl)-1-butene, 1,3,4,4,4pentafluoro-3-(trifluoromethyl)-1-butene, 1,1,4,4,4 pentafluoro-2-(trifluoromethyl)-1-butene, 1,1,1,4,4,5,5,5-octafluoro-2-pentene, 3,4,4,4-tetrafluoro-3-(trifluoromethyl)-1-butene, 3,3,4,4,5,5,5-heptafluoro-1-pentene, 2,3,3,4,4,5,5-heptafluoro-1-pentene, 1,1,3,3,5,5,5 heptafluoro-1-pentene, 1,1,2,4,4,4-heptafluoro-3-methyl 2-butene, 2,4,4,4-tetrafluoro-3-(trifluoromethyl)-1-butene, 1,4,4,4-tetrafluoro-3-(trifluoromethyl)-2-butene, 1,4,4,4-tetrafluoro-3-(trifluoromethyl)-2-butene, 2,4,4,4-tetrafluoro-3-

(trifluoromethyl)-2-butene, 3-(trifluoromethyl)-4,4,4-trifluoro-2-butene, 3,4,4,5,5,5-hexafluoro-2-pentene, 1,1,1,4,4,4-hexafluoro-2-methyl-2-butene, 3,3,4,5,5,5-hexafluoro-1-pentene, 4,4,4-trifluoro-2-(trifluoromethyl)-1-butene, 1,1,2,3,3,4,4,5,5,6,6,6-dodecafluoro-1-hexene, 1,1,1,2,2,3,4,5,5,6,6,6-dodecafluoro-3-hexene, 1,1,1,4,4,4-hexafluoro-2,3-bis(trifluoromethyl)-2-butene, 1,1,1,4,4,5,5,5-octafluoro-2trifluoromethyl-2-pentene, 1,1,1,3,4,5,5,5-octafluoro-4(trifluoromethyl)-2-pentene, 1,1,1,4,5,5,5-heptafluoro-4 (trifluoromethyl)-2-pentene, 1,1,1,4,4,5,5,6,6,6-decafluoro 2-hexene, 1,1,1,2,2,5,5,6,6,6-decafluoro-3-hexene, 3,3,4,4,5,5,6,6,6-nonafluoro-1-hexene, 4,4,4-trifluoro-3,3-bis(trifluoromethyl)-1-butene, 1,1,1,4,4,4-hexafluoro-3-methyl-2-(trifluoromethyl)-2-butene, 2,3,3,5,5,5-hexafluoro-4-(trifluoromethyl)-1-pentene, 1,1,1,2,4,4,5,5,5-nonafluoro-3-methyl-2-pentene, 1,1,1,5,5,5-hexafluoro-4(trifluoromethyl)-2-pentene, 3,4,4,5,5,6,6,6-octafluoro-2 hexene, 3,3,4,4,5,5,6,6-octafluoro-2-hexene, 1,1,1,4,4 pentafluoro-2-(trifluoromethyl)-2-pentene, 4,4,5,5,5-pentafluoro-2-(trifluoromethyl)-1-pentene, 3,3,4,4,5,5,5-heptafluoro-2-methyl-1-pentene, 1,1,1,2,3,4,4,5,5,6,6,7,7,7 tetradecafluoro-2-heptene, 1,1,2,2,3,4,5,5,6,6,7,7,7 tetradecafluoro-2-heptene, 1,1,1,3,4,4,5,5,6,6,7,7,7 tridecafluoro-2-heptene, 1,1,1,2,4,4,5,5,6,6,7,7,7 tridecafluoro-2-heptene, 1,1,1,2,2,4,5,5,6,6,7,7,7 tridecafluoro-3-heptene, 1,1,1,2,2,3,5,5,6,6,7,7,7 tridecafluoro-3-heptene, 4,4,5,5,6,6,6-heptafluoro-2-hexene, 4,4,5,5,6,6,6-heptafluoro-1-hexene, 1,1,1,2,2,3,4-heptafluoro-3-hexene, 4,5,5,5-tetrafluoro-4-(trifluoromethyl)-1-pentene, 1,1,1,2,5,5,5-heptafluoro-4-methyl-2-pentene, 1,1,1,3-tetrafluoro-2-(trifluoromethyl)-2-pentene, 1,2,3,3,4,4 hexafluorocyclobutene, 3,3,4,4-tetrafluorocyclobutene, 3,3,4,4,5,5-hexafluorocyclopentene, 1,2,3,3,4,4,5,5 octafluorocyclopentene, 1,2,3,3,4,4,5,5,6,6 decafluorocyclohexene, 1,1,1,2,3,4,5,5,5-nonafluoro-4 (trifluoromethyl)-2-pentene, pentafluoroethyl trifluorovinyl ether, trifluoromethyl trifluorovinyl ether; or any combination thereof.

Additionally, there could be one or more non-low GWP refrigerant components comprising the refrigerant portion. Minor et al. (US Patent Application Publication No. 2007/0289317, hereby incorporated by reference) further lists examples of saturated and unsaturated fluorocarbon refrigerants which may be used as the fluoroalkane in the present invention. As set forth in paragraph 81 of Minor et. al., representative hydrofluorocarbons may be represented by the formula $C_xH_{2x+2y}F_y$ or $C_xH_{2xy}F_y$, where, x may equal 3 through 8 and y may equal 1 through 17. The hydrofluorocarbons may be straight chain, branched chain or cyclic; saturated or unsaturated compounds having from about 3 to 8 carbon atoms. Without limitation, exemplary fluoroalkanes which may be used, as set forth in Minor et al. paragraphs 47-78, include: 1,1,2,2,3-pentafluoropropane, 1,1,1,3,3-pen tafluoropropane; 1,1,3-trifluoropropane; 1,1,3-trifluoropropane; 1,3-difluoropropane; 2-(difluoromethyl)-1,1,1,2,3,3 hexafluoropropane; 1,1,2,2,3,3,4,4-octafluorobutane; 1,1,1,2,2,4-hexafluorobutane; 1,1,1,3,3-pentafluorobutane; 1,1 difluorobutane; 1,3-difluoro-2-methylpropane, 1,2-difluoro 2-methylpropane; 1,2-difluorobutane, 1,3-difluorobutane, 1,4-difluorobutane; 2,3-difluorobutane; 1,1,1,2,3,3,4,4-octafluoro-2-(trifluoromethyl)butane; 1,1,2,2,3,3,4,4,5,5-undecafluoropentane, 1,1,1,2,2,3,4,5,5,5-decafluoropentane; 1,1,1,2,2,3,3,5,5,5-decafluoropentane.

The refrigerant or refrigerant blend portion of said invention will have GWP less than 300, but specifically less than 150 GWP and more specifically less than 75 GWP and ideally less than 5 GWP. It is possible that a refrigerant is used such that the GWP<1.

The refrigerant portion of the blend mentioned above has a minimum ignition energy (MIE) of at least 300 MJ/kg, preferably higher than 1,000 MJ/kg, and more specifically between 1,000 MJ/kg to 5,000 MJ and even more specifically at least 5,000 MJ/kg as measured by ASTM E-582. The heat of combustion, as calculated by the American Society of Heating, Refrigeration and Air-conditioning Engineers (ASHRAE) Standard 34, should be less than 19,000 kJ/kg and more specifically in the range of 8-12 kJ/kg and even more specifically, 9.5-11.5 kJ/kg. The lower flammability limit at 21° C. of the refrigerant portion may actual be non-flammable as measured by ASTM E-681. Alternatively, if the refrigerant portion has flammability limits, the lower flammability limit may be at least 5 volume % but more specifically at least 6 volume % and even more specifically, at least 6.2 volume % as measured by ASTM E-681.

The overall resulting composition, i.e., lubricant and refrigerant mentioned herein can be "post-added" to the A/C system, advantageously has relatively low corrosivity, such that a metal (e.g., aluminum, copper, or iron) which is part of the A/C system in contact with the composition experiences relatively low corrosion. Additionally, after testing for 14 days at 175° C., there was no dulling of the steel, no coating or visible corrosion to the metals coupons and no deposits or flocs formed during testing.

The relatively low corrosivity of the lubricant/refrigerant composition may be such that the refrigerant composition portion advantageously exhibits one or any combination of the following properties. A total acid number, after aging per ASHRAE 97: 2007 "Sealed Glass Tube Method to Test the Chemical Stability of Materials for Use within Refrigerant Systems" for 14 days at 175° C., less than 3.3 mg KOH/g, and less than 1.5 mg KOH/g and specifically less than 1.0 mg KOH/g as measured per ASTM D664-01. With aluminum, copper and carbon steel metal strips; a total halides concentration (e. g., a fluorine ion concentration) of less than about 100 ppm, preferably less than 50 ppm and ideally less than 10 ppm after aging per ASHRAE 97: 2007 "Sealed Glass Tube Method to Test the Chemical Stability of Materials for Use within Refrigerant Systems" for 14 days at 175° C. With aluminum, copper and iron metal strips, as measured by ion chromatography; a total organic acid concentration of less than about 300 ppm after aging per ASHRAE 97: 2007 "Sealed Glass Tube Method to Test the Chemical Stability of Materials for Use within Refrigerant Systems" for 14 days at 175° C.

Additives which can improve the refrigerant and A/C lifetime and compressor durability are desirable. In one aspect of the invention, the inventive refrigerant containing composition is used to introduce lubricant into the A/C system as well as other additives, such as a) acid scavengers, b) performance enhancers, and c) flame suppressants.

Acid Scavenger

An acid scavenger may comprise a siloxane, an activated aromatic compound, or a combination of both. Serrano et al (paragraph 38), which is hereby incorporated by reference, discloses that the siloxane may be any molecule having a siloxy functionality. The siloxane may include an alkyl siloxane, an aryl siloxane, or a siloxane containing mixtures of aryl and alkyl substituents. For example, the siloxane may be an alkyl siloxane, including a dialkylsiloxane or a polydialkylsiloxane. Preferred siloxanes include an oxygen atom bonded to two silicon atoms, i.e., a group having the structure: SiOSi. For example, the siloxane may be a siloxane of Formula IV: R1[Si(R2R3)4O]nSi(R2R3)R4, Where n is 1 or more. Siloxanes of Formula IV have n that is preferably 2 or more, more preferably 3 or more, (e.g., about 4 or more). Siloxanes of formula IV have n that is preferably about 30 or less, more preferably about 12 or less, and most preferably about 7 or less. Preferably the R4 group is an aryl group or an alkyl group. Preferably the R2 groups are aryl groups or alkylgroups or mixtures thereof. Preferably the R3 groups are aryl groups or alkyl groups or mixtures thereof. Preferably the R4 group is an aryl group or an alkyl group. Preferably R1, R2, R3, R4, or any combination thereof are not hydrogen. The R2 groups in a molecule may be the same or different. Preferably the R2 groups in a molecule are the same. The R2 groups in a molecule may be the same or different from the R3 groups. Preferably, the R2 groups and R3 groups in a molecule are the same. Preferred siloxanes include siloxanes of Formula IV, wherein R1, R2, R3, R4, R5, or any combination thereof is a methyl, ethyl, propyl, or butyl group, or any combination thereof. Exemplary siloxanes that may be used include hexamethyldisiloxane, polydimethylsiloxane, polymethylphenylsiloxane, dodecamethylpentasiloxane, decamethylcyclo-pentasiloxane, decamethyltetrasiloxane, octamethyltrisiloxane, or any combination thereof.

Incorporated by reference from Serrano et al paragraph [0039] notes that in one aspect of the invention, the siloxane is an alkylsiloxane containing from about 1 to about 12 carbon atoms, such as hexamethyldisiloxane. The siloxane may also be a polymer such as polydialkylsiloxane, Where the alkyl group is a methyl, ethyl, propyl, butyl, or any combination thereof. Suitable polydialkylsiloxanes have a molecular weight from about 100 to about 10,000. Highly preferred siloxanes include hexamethyldisiloxane, polydimethylsiloxane, and combinations thereof. The siloxane may consist essentially of polydimethylsiloxane, hexamethyldisiloxane, or a combination thereof.

The activated aromatic compound may be any aromatic molecule activated towards a Friedel-Crafts addition reaction, or mixtures thereof. An aromatic molecule activated towards a Friedel-Crafts addition reaction is defined to be any aromatic molecule capable of an addition reaction with mineral acids. Especially aromatic molecules capable of addition reactions with mineral acids either in the application environment (AC system) or during the ASHRAE 97: 2007 "Sealed Glass Tube Method to Test the Chemical Stability of Materials for Use within Refrigerant Systems" thermal stability test. Such molecules or compounds are typically activated by substitution of a hydrogen atoms of the aromatic ring with one of the following groups: NH2, NHR, NRz, ADH, AD, NHCOCH3, NHCOR, 4OCH3, OR, CH3, 4C2H5, R, or C6H5, where R is a hydrocarbon (preferably a hydrocarbon containing from about 1 to about 100 carbon atoms). The activated aromatic molecule may be an alcohol, or an ether, where the oxygen atom (i.e., the oxygen atom of the alcohol or ether group) is bonded directly to an aromatic group. The activated aromatic molecule may be an amine where the nitrogen atom (i.e., the nitrogen atom of the amine group) is bonded directly to an aromatic group. By way of example, the activated aromatic molecule may have the formula ArXRn, Where X is O (i.e., oxygen) or N (i.e., nitrogen); n:1 When X:O; n:2 When x:N; Ar is an aromatic group (i.e., group, C6H5); R may be H or a carbon containing group; and When n:2, the R groups may be the same or different. For example, R may be H (i.e., hydrogen), Ar, an alkyl group, or any combination thereof, exemplary activated aromatic molecules that may be employed in a refrigerant composition according to the teachings herein include diphenyl oxide (i.e., diphenyl ether), methyl phenyl ether (e.g., anisole), ethyl phenyl ether, butyl phenyl ether or any combination thereof. One highly preferred aromatic molecule activated towards a Friedel-Crafts addition reaction is diphenyl oxide.

Incorporated by reference from Serrano et al paragraph [0045] The acid scavenger (e.g., the activated aromatic compound, the siloxane, or both) may be present in any concentration that results in a relatively low total acid number, a relatively low total halides concentration, a relatively low total organic acid concentration, or any combination thereof. Preferably the acid scavenger is present at a concentration greater than about 0.0050 wt %, more preferably greater than about 0.05 wt % and even more preferably greater than about 0.1 wt % (e.g. greater than about 0.5 wt %) based on the total weight of the refrigerant composition. The acid scavenger preferably is present in a concentration less than about 3 wt %, more preferably less than about 2.5 wt % and most preferably greater than about 2 wt % (e. g. less than about 1.8 wt %) based on the total weight of the refrigerant composition.

Additional examples of acid scavengers which may be included in the refrigerant composition and preferably are excluded from the refrigerant composition include those described by Kaneko (U.S. patent application Ser. No. 11/575,256, published as U.S. Patent Publication 2007/0290164, paragraph 42, expressly incorporated herein by reference), such as one or more of: phenyl glycidyl ethers, alkyl glycidyl ethers, alkyleneglycolglycidylethers, cyclohexeneoxides, otolenoxides, or epoxy compounds such as epoxidized soybean oil, and those described by Singh et al. (U.S. patent application Ser. No. 11/250,219, published as 20060116310, paragraphs 34-42, expressly incorporated herein by reference).

Performance Enhancers

Preferred additives include those described in U.S. Pat. Nos. 5,152,926; 4,755,316, which are hereby incorporated by reference. In particular, the preferred extreme pressure additives include mixtures of (A) tolyltriazole or substituted derivatives thereof, (B) an amine (e.g. Jeffamine M-600) and (C) a third component which is (i) an ethoxylated phosphate ester (e.g. Antara LP-700 type), or (ii) a phosphate alcohol (e.g. ZELEC 3337 type), or (iii) a Zinc dialkyldithiophosphate (e.g. Lubrizol 5139, 5604, 5178, or 5186 type), or (iv) a mercaptobenzothiazole, or (v) a 2,5-dimercapto-1,3,4-triadiaZole derivative (e. g. Curvan 826) or a mixture thereof. Additional examples of additives which may be used are given in U.S. Pat. No. 5,976,399 (Schnur, 5:12-6:51, hereby incorporated by reference).

Acid number is measured according to ASTM D664-01 in units of mg KOH/g. The total halides concentration, the fluorine ion concentration, and the total organic acid concentration is measured by ion chromatography. Chemical stability of the refrigerant system is measured according to ASHRAE 97: 2007 "Sealed Glass Tube Method to Test the Chemical Stability of Materials for Use within Refrigerant Systems". The viscosity of the lubricant is tested at 40° C. according to ASTM D-7042.

Mouli et al. (WO 2008/027595) teaches the use of alkyl silanes as a stabilizer in refrigerant compositions containing fluoroolefins. Phosphates, phosphites, epoxides, and phenolic additives also have been employed in certain refrigerant compositions. These are described for example by Kaneko (U.S. patent application Ser. No. 11/575,256, published as U.S. Publication 2007/0290164) and Singh et al. (U.S. patent application Ser. No. 11/250,219, published as U.S.

Publication 2006/0116310). All of these aforementioned applications are expressly incorporated herein by reference.

Flame Suppressants

Preferred flame suppressants include those described in patent application "Compositions containing fluorine substituted olefins CA 2557873 A1" and incorporated by reference along with fluorinated products such as HFC-125 and/or Krytox® lubricants, also incorporated by reference and described in patent application "Compositions comprising fluoroolefins and uses thereof WO2009018117A1."

Miscibility/Package Stability

While HFO-1234yf when used as the main refrigerant for vehicle A/C systems, is generally found to be compatible with polyalkylene glycol or PAG type lubricants, not all PAGs lubricants have the required miscibility range, thermal stability, material compatibility, moisture level, among other characteristics to be suitable for use with HFO-1234yf in automotive A/C systems. Accordingly, the inventive composition is substantially free of PAG lubricants lacking the foregoing characteristics. By "substantially free" it is meant that when the inventive composition comprises HFO-1234yf the composition contains less than 5 wt %, typically less than 3 wt % and in some cases less than 0.5 wt % of the following double end-capped PAG ND-8, single end-capped PAG Dow RL244. The amount of lubricant that is typically used in the A/C system ranges from about 5 to about 10 wt % of the amount of A/C refrigerant. For example, an A/C refrigerant charge of 600 g, 60 g of lubricant will be used (90 wt % refrig/10 wt % lubricant). However, since refrigerant will be used to transfer the lubricant into the A/C system, the amount of PAG oil that will be used in conjunction with refrigerant, will be relatively large, on the order of 50-80 wt % lubricant/20-50 wt % refrigerant (e.g., about 60 to about 65 wt % lubricant).

The major component of the inventive composition can comprise lubricant, while the minor component/s will comprise refrigerant, with some low amount (0-5 wt %) of additives that improve a desired performance property. That is, the refrigerant will be used to convey or transfer the liquid lubricant and additives into the A/C system.

The lubricant and refrigerant must have mutual miscibility over a much greater range due to storage and use conditions. There are many global cities that experience temperatures exceeding 37.5° C. Additionally, it is expected that the lubricant/oil composition would be stored at relatively hot warehouse or used in hot garage where temperatures could reach as high as 37.5° C. for a period of greater than 70 days.

It is also conceivable that the product could be used during the winter months after a major vehicle system failure such as a front-end collision.

The lubricant/refrigerant composition is stable at temperatures of about −20, −30, and even −40-° C. which should aid in storing of said composition at temperatures of −20 C for longer periods such as 5 days.

It was surprising that the inventive composition maintains miscibility over a wide range of temperature and pressure conditions (e.g., a composition 20-50 wt % refrigerant/50-80 wt % lubricant that is miscible over a temperature range of −18° C. to 37° C. at a pressure of 160 kPa to 945 kPa within a sealed container). PAG lubricant/refrigerant miscibility is conducted by loading predetermined amounts of lubricants and refrigerants (see tables below) into sealed tubes using ASHRAE 97: 2007 "Sealed Glass Tube Method to Test the Chemical Stability of Materials for Use within Refrigerant Systems" method. Then, the sealed tubes are set into water baths to determine if a mixture is miscible over a range of temperatures. The test is conducted in two segments with a 24-hour period between each segment to allow tubes to come back to room temperature prior to starting the next segment. The cold segment is started at room temperature and slowly decreases temperature to −50° C. in 5° C. increments holding at each temperature for 10 minutes and recording visual observation at each temperature hold. The hot segment is started at room temperature and slowly increases temperature to 90° C. or critical temperature of the refrigerant being tested in 5° C. increments and again holding at each temperature for 10 minutes and recording visual observation at each temperature hold.

PAG lubricant/refrigerant compositions were evaluated for thermal stability using ASHRAE 97: 2007 "Sealed Glass Tube Method to Test the Chemical Stability of Materials for Use within Refrigerant Systems". The lubricant/refrigerant systems were also placed in sealed tubes containing metal (Al, Cu, carbon steel) coupons and held at 175° C. for two weeks. Results indicate that the PAG lubricant/low GWP refrigerant/s are thermally stable under elevated temperature which indicates that compositions should not break down during storage. There was no dulling of on the steel, no coating or visible corrosion to the metals and no fluoride ion or acid generation. No deposits or flocs formed during testing. There was no color change to the refrigerant/lubricant system.

An unknown result was that lubricants which were conventionally listed as "compatible with HFO-1234yf" do not have miscibility across the entire miscibility range. The PAG lubricants noted as 46 cSt type PAG oils and known by the following tradenames "ND-12", "SP-A2", "PS-D1", and "FD46XG" were found to meet all desired criteria.

Without wishing to be bound by any theory or explanation, it is believed that once the refrigerant concentration increases to become the major portion of the composition, the lubricant/lubricant miscibility range changes. For example, a 30 wt % lubricant/70 wt % refrigerant would be marginal for use in an A/C system, but lacks sufficient miscibility to use the refrigerant to transfer the lubricant into the system.

The conventional PAG lubricant (Idemitsu® ND-8) used with R-134a did not have the same miscibility range with R-1234yf (unsaturated low GWP refrigerant) nor did it have the same thermal stability. It was found that 1234yf/ND-8 generated higher than desired TAN values (>1.0 mg KOH/g) and higher halide values (>100 ppm) after testing per ASHRAE 97: 2007 "Sealed Glass Tube Method to Test the Chemical Stability of Materials for Use within Refrigerant Systems" sealed tube testing for 2 weeks at 175 C. Therefore, only select double end-capped PAGs were found to have the desired miscibility and thermal stability with low GWP HFO-1234yf refrigerant.

Examples of the low GWP refrigerant/PAG oil compositions and miscibility range are shown in Table 2 where the upper portion of the table shows product use in A/C system and the lower portion of the table shows manufacturing and storage temperatures (wherein "M" means miscible and "N" means non-miscible).

TABLE 2

Lubricant: ND12

| refrigerant/oil | amt. oil (ml) | Temperature (C.) | | | | | | | | | | | | | |
|---|---|---|---|---|---|---|---|---|---|---|---|---|---|---|---|
| | | −50 | −45 | −40 | −35 | −30 | −25 | −20 | −15 | −10 | −5 | 0 | 5 | 10 | 15 | 20 |
| 95/5% | 0.1 | N | M | M | M | M | M | M | M | M | M | M | M | M | M | M |
| 90/10% | 0.2 | N | M | M | M | M | M | M | M | M | M | M | M | M | M | M |
| 85/15% | 0.3 | N | M | M | M | M | M | M | M | M | M | M | M | M | M | M |
| 80/20% | 0.4 | N | M | M | M | M | M | M | M | M | M | M | M | M | M | M |
| 70/30% | 0.6 | N | M | M | M | M | M | M | M | M | M | M | M | M | M | M |
| 40/60% | 1.2 | N | M | M | M | M | M | M | M | M | M | M | M | M | M | M |
| 30/70% | 1.4 | N | M | M | M | M | M | M | M | M | M | M | M | M | M | M |

| refrigerant/oil | amt. oil (ml) | Temperature (C.) | | | | | | | | | | | | | |
|---|---|---|---|---|---|---|---|---|---|---|---|---|---|---|---|
| | | 25 | 30 | 35 | 40 | 45 | 50 | 55 | 60 | 65 | 70 | 75 | 80 | 85 | 90 |
| 95/5% | 0.1 | M | M | M | M | M | M | M | N | N | N | N | N | N | N |
| 90/10% | 0.2 | M | M | M | N | N | N | N | N | N | N | N | N | N | N |
| 85/15% | 0.3 | M | N | N | N | N | N | N | N | N | N | N | N | N | N |
| 80/20% | 0.4 | M | N | N | N | N | N | N | N | N | N | N | N | N | N |
| 70/30% | 0.6 | M | M | N | N | N | N | N | N | N | N | N | N | N | N |
| 40/60% | 1.2 | M | M | M | M | M | M | M | M | M | M | M | M | M | M |
| 30/70% | 1.4 | M | M | M | M | M | M | M | M | M | M | M | M | M | M |

One aspect of the invention relates to a method for introducing lubricant into the A/C system. In the inventive method, refrigerant is used to convey the lubricant and/or lubricant additive package down the A/C hose substantially without adhering to the hose thereby ensuring more lubricant or lubricant/additive package is introduced into the A/C system (e.g., using the hand injector or hand pump can lead to lubricant adhering to the hose lines connecting to the A/C system). Use of the refrigerant to transfer the lubricant to the system ensures that more lubricant is introduced into the A/C system versus the hand or pump injectors as the refrigerant carries the lubricant and conveys the lubricant into the A/C system. The lubricant or lubricant/additive and refrigerant are co-packaged into a conventional container or can under conditions in which the lubricant and refrigerant are miscible. Upon leaving the small can, the refrigerant will change state from compressed liquefied gas to refrigerant gas. During this process, refrigerant which is miscible with the lubricant will atomize the lubricant or lubricant/additive mixture and will convey the lubricant or lubricant/additive mixture further along the hose and into the A/C system before the lubricant or lubricant/additive mixture can settle out on the A/C recharge hose walls.

Another aspect of the invention relates to a method for introducing environmentally friendly refrigerant into the A/C system. In this inventive method, refrigerant/lubricant with or without an additive package is introduced into the system using the same conveyance method as described above with the same positive results as mentioned above.

The inventive composition (lubricant or lubricant/additive with refrigerant) can be packaged into a small sealed can that is typically 8 oz or less, and more typically 3-6 oz and even more specifically, 3-4 oz. The inventive composition should be packaged in a small can that has a piercing can top or self-sealing can top that can be connected to the vehicle's A/C system using a typical aftermarket refrigerant recharging hose.

In one embodiment, the fittings used on the top of the can should be left-hand thread and meet a male CGA 166 type connection as this product is intended to be used in a low GWP A/C system that contains HFO-1234yf. The type of hose used to convey this product from the can to the vehicle's A/C system should meet the SAE J2888 standard for construction. The hose should have two different fittings. One end of the A/C recharge hose should be able to connect to the small can and have either a piercing needle or a plunger type mechanism, sometimes called a can tap, which can liberate the product contained within the small can. The fitting that connects to the can will be a female CGA 166 type fitting. The other end of the recharge hose should have the designated SAE J639 low side quick connect coupler for HFO-1234yf and should be able to attach to the vehicle's A/C system through the low side service port.

To convey the inventive composition into the A/C system, first the can containing the lubricant or lubricant/additive and refrigerant should be well shaken. The vehicle's engine should be started and then the A/C system set to maximum cooling. Then, the aftermarket recharge hose as mentioned above, should be attached to the can. The other side of the hose should be connected to the vehicle's A/C low side service port. When ready to start dispensing the product, the needle or plunger mechanism should be used to liberate the can contents. The can should be shaken slightly from side to side to help liberate the can contents. This process should take about 10-15 minutes.

The instant composition can be used for adding lubricant or lubricant/additive to the A/C system at temperatures between about 0° C. and about 40° C., more specifically, this composition can be used at temperatures of about 10° C. and about 35° C., and even more specifically at temperatures of about 15° C. to about 30° C. The inventive composition can be stored at temperatures as low as about −20° C. and as high as about 40° C. to about 45° C., but typically, it will be stored at temperatures of about 10° C. to about 35° C. and more specifically at temperatures of about 15° C. to about 30° C. Typically, when connected to the A/C system, the inventive composition will be delivered to the A/C system at pressures between about 315 kPa and about 435 kPa, or more specifically between about 330 kPa and about 410 kPa, or even more specifically at pressures between about 360 kPa and about 400 kPa.

Another aspect of the invention relates to a system for introducing the inventive composition into a heat management system such as an automotive A/C system. Referring now to FIG. 1, FIG. 1 illustrates a system (100) for introducing lubricant using the inventive composition into an automotive A/C system. The system for delivering the inventive composition to an automotive A/C system comprises a container (110) comprising the composition, a compressor (120), a condenser (130), a dryer (140), an expansion valve (150), and an evaporator (160). The system (100) additionally includes a low side service port (170) and a high side service port (180). The container (110) or can housing the inventive composition is connected via a hose (190) to a low side service port (170) of the compressor (120). The hose (190) and lines (195) connecting the compressor, condenser, dryer, expansion valve and evaporator are constructed and assembled using materials and methods known in the art.

Figure 2:
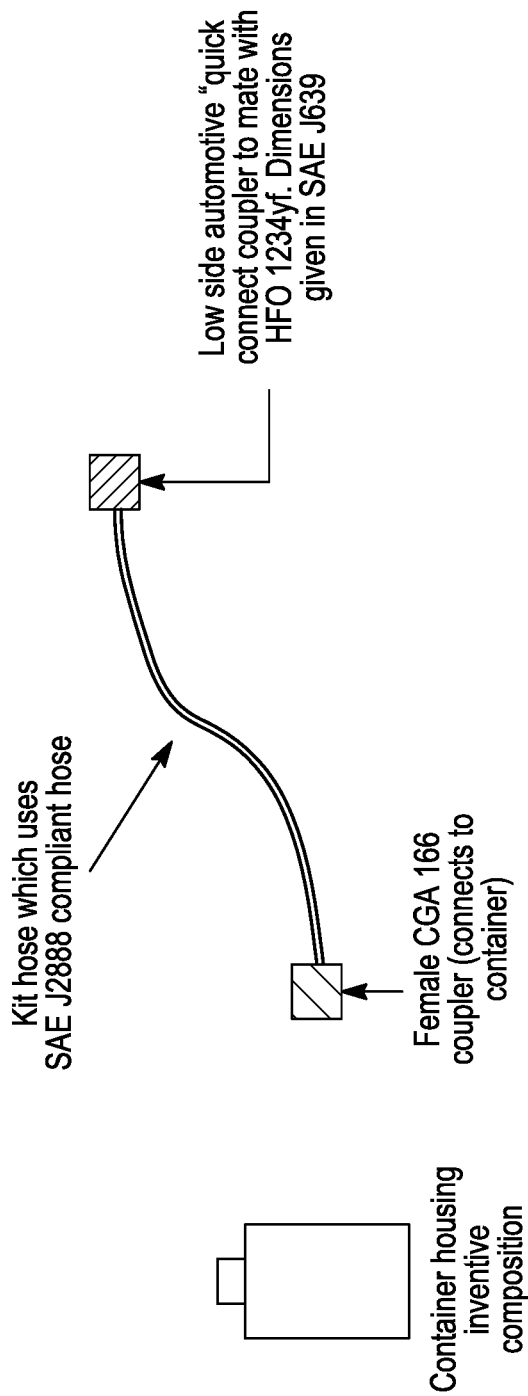
FIG. 2 is a photo of a kit for use in delivering the inventive composition from a container into an A/C system.

A further aspect of the invention relates to a kit. Referring now to FIG. 2, FIG. 2 illustrates a kit (200) comprising: a container (210) having a container coupler (215) and comprising the inventive composition, a hand operated dispenser (220) for controlling the flow of the composition into an A/C system (230). The dispenser (220) further includes a dispenser coupler (240) configured to attach to the container coupler (215) to facilitate transfer of the inventive composition into the A/C system (230). A hose (250) connects the dispenser (220) to the A/C system (230) and is configured to convey the composition from the dispenser (220) to the A/C system (230).

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method that includes materials, steps, features, components, or elements, in addition to those literally disclosed provided that these additional included materials, steps, features, components, or elements do materially affect the basic and novel characteristic(s) of the claimed invention, especially the mode of action to achieve the desired result of any of the processes of the present invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also include such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Although certain aspects, embodiments and principals have been described above, it is understood that this description is made only way of example and not as limitation of the scope of the invention or appended claims.

The following is claimed:

1. A pressurized lubricant-refrigerant composition comprising about 50 to about 80 wt. % polyalkylene glycol lubricant and about 20 to about 50 wt. % of a refrigerant which is miscible under pressure up to 945 kPa and at temperatures over a range of −18° C. to 37° C., wherein the refrigerant exhibits a global warming potential (GWP) of less than about 100.

2. The composition of claim 1 wherein the pressure comprises about 160 kPa to about 945 kPa.

3. The composition of claim 1 which further comprises about 1 to about 5 wt. % acid scavengers.

4. The composition of claim 3 which further comprises at least one member selected from the group consisting of hexamethyldisiloxane, polydimethylsiloxane, polymethylphenylsiloxane, dodecamethylpentasiloxane, decamethylcyclo-pentasiloxane, decamethyltetrasiloxane, or octamethyltrisiloxane.

5. A method for delivering the composition of claim 4 of a vehicle air conditioning system comprising transferring the pressurized composition into the vehicle air conditioning under pressure and temperature conditions under which the polyalkylene glycol lubricant is miscible with the refrigerant.

6. A sealed container maintaining the composition of claim 3 under a pressure of 160 kPa to 945 kPa to deliver the composition to a vehicle air conditioning system at between about 315 kPa and about 435 kPa.

7. A kit comprising the sealed container of claim 6, fitting adapted to connect to the sealed container and A/C recharge hose.

8. The composition of claim 1, wherein the refrigerant is at least one member selected from the group consisting of 1,2,3,3,3-pentafluoro-1-propene, 1,1,3,3,3 pentafluoro-1-propene, 1,1,2,3,3-pentafluoro-1-propene, 1,2,3,3-tetrafluoro-1-propene, 2,3,3,3-tetrafluoro-1-propene, 1,3,3,3-tetrafluoro-1-propene, 1,1,2,3-tetrafluoro-1-propene, 1,1,3,3-tetrafluoro-1-propene and 1,2,3,3-tetrafluoro-1-propene.

9. A method for delivering the composition of claim 8 of a vehicle air conditioning system comprising transferring the pressurized composition into the vehicle air conditioning under pressure and temperature conditions under which the polyalkylene glycol lubricant is miscible with the refrigerant.

10. A system for delivering the composition of claim 8 to an automotive air conditioning system comprising: a compressor, a condenser, a dryer, an expansion valve, and an evaporator.

11. A sealed container maintaining the composition of claim 8 under a pressure of 160 kPa to 945 kPa to deliver the composition to a vehicle air conditioning system at between about 315 kPa and about 435 kPa.

12. A kit comprising the sealed container of claim 11, fitting adapted to connect to the sealed container and A/C recharge hose.

13. The composition of claim 1 further comprises about 1 to about 5 wt. % performance enhancers.

14. The composition of claim 1 further comprises about 1 to about 10 wt. % of flame suppressants.

15. A method for delivering the composition of claim 1 of a vehicle air conditioning system comprising transferring the pressurized composition into the vehicle air conditioning under pressure and temperature conditions under which the polyalkylene glycol lubricant is miscible with the refrigerant.

16. The method of claim 15 further comprising delivering acid scavengers, performance enhancers, or flame suppressants into the vehicle air conditioning system.

17. A system for delivering the composition of claim 1 to an automotive air conditioning system comprising: a compressor, a condenser, a dryer, an expansion valve, and an evaporator.

18. A sealed container maintaining the composition of claim 1 under a pressure of 160 kPa to 945 kPa to deliver the composition to a vehicle air conditioning system at between about 315 kPa and about 435 kPa.

19. A kit comprising the sealed container of claim 18, fitting adapted to connect to the sealed container and A/C recharge hose.

\* \* \* \* \*